US012110216B2

(12) United States Patent
Jin et al.

(10) Patent No.: US 12,110,216 B2
(45) Date of Patent: Oct. 8, 2024

(54) FOLDABLE RAIL-MOUNTED CRANE STOP DEVICE

(71) Applicant: SOUTHEAST UNIVERSITY, Jiangsu (CN)

(72) Inventors: Hui Jin, Jiangsu (CN); Haihan Jiao, Jiangsu (CN); Keqin Ding, Jiangsu (CN); Libin Wang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 696 days.

(21) Appl. No.: 17/368,801

(22) Filed: Jul. 6, 2021

(65) Prior Publication Data

US 2022/0024729 A1 Jan. 27, 2022

(30) Foreign Application Priority Data

Jul. 23, 2020 (CN) ......................... 202010716692.5

(51) Int. Cl.
*B66C 9/18* (2006.01)
*B61K 7/04* (2006.01)
*B66C 7/16* (2006.01)

(52) U.S. Cl.
CPC .................. *B66C 9/18* (2013.01); *B61K 7/04* (2013.01); *B66C 7/16* (2013.01)

(58) Field of Classification Search
CPC .... B66C 9/18; B66C 7/16; B61K 7/04; B61K 7/16; B61K 7/20
See application file for complete search history.

(56) References Cited

U.S. PATENT DOCUMENTS

| | | | | |
|---|---|---|---|---|
| 3,425,517 A * | 2/1969 | Speir | E01F 13/08 188/32 |
| 8,485,106 B2 * | 7/2013 | Thyssen, Jr. | B61K 7/20 104/259 |
| 11,718,278 B2 * | 8/2023 | Anderl | B60T 3/00 188/32 |
| 2011/0232521 A1 * | 9/2011 | Heyden | B61K 7/20 104/249 |
| 2012/0012027 A1 * | 1/2012 | Thyssen, Jr. | B61K 7/20 104/259 |
| 2021/0146892 A1 * | 5/2021 | Anderl | B60T 3/00 |

FOREIGN PATENT DOCUMENTS

| | | | |
|---|---|---|---|
| CN | 104671085 A * | 6/2015 | B66C 9/16 |
| CN | 110901684 | 3/2020 | |
| JP | 2010247944 | 11/2010 | |
| KR | 20140121624 A * | 10/2014 | |

OTHER PUBLICATIONS

"Office Action of China Counterpart Application" with English translation thereof, issued on Dec. 22, 2020, p. 1-p. 12.

* cited by examiner

*Primary Examiner* — Vishal R Sahni
(74) *Attorney, Agent, or Firm* — JCIP GLOBAL INC.

(57) ABSTRACT

A foldable rail-mounted crane stop device includes an actuating device, a slidably fixing device and a braking device. The actuating device is mounted on a crane rail for bearing the pressure of a crane wheel and thereby actuating the braking device, the slidably fixing device is mounted at an end of the crane rail, and the braking device is connected with the slidably fixing device for braking the crane wheel. The device provided by the present invention is used for crane braking at the end of a rail.

4 Claims, 9 Drawing Sheets

FOLDABLE RAIL-MOUNTED CRANE STOP DEVICE

CROSS-REFERENCE TO RELATED APPLICATION

This application claims the priority benefit of China application serial no. 202010716692.5, filed on Jul. 23, 2020. The entirety of the above-mentioned patent application is hereby incorporated by reference herein and made a part of this specification.

BACKGROUND

Technical Field

The present invention relates to the technical field of crane rail stop, in particular to a foldable rail-mounted crane stop device.

Description of Related Art

As equipment for moving heavy objects vertically and horizontally, crane is indispensable in industrial production. In recent years, with the continuous development of industrial technology, the requirements for the operation ability of the crane have become higher and higher. Therefore, the market for giant crane has developed rapidly. However, as an outdoor equipment, the crane is often set up at locations such as ports and wharfs where paroxysmal gusts may easily occur. As a high-rise structure, the crane has a large windward area and a high center point of wind action. Therefore, industrial accidents such as crane damage are more likely to occur.

At present, to solve the safe braking problem of cranes, a series of crane stop devices have been invented in related industrial technical fields. All of these devices have energy consumption and shock absorption effects, which are installed at the ends of rails of cranes, and are conducive to the safe braking of the cranes.

At present, the braking modes of existing stop devices mainly include rigid stop, elastic stop, and ramp stop. Rigid stop devices are made of rigid materials such as steel and concrete, and can be used only for the braking of cranes that travel at a low speed under the action of low-level wind, otherwise instability and overturn of the cranes may be caused. Ramp stop devices require a long ramp arranged at the end of the crane rail and involves a long braking distance, in addition, if the inclination angle of the ramp is too large, the center of gravity of the crane will be too high which may easily cause derailment of the crane. The elastic stop devices are manufactured from an elastic material such as springs or rubber, and they attain a braking effect by absorbing the kinetic energy of the crane and converting the kinetic energy into elastic energy, and therefore, more and more crane stop devices employ this form of stopping.

SUMMARY

To solve the technical problems of poor braking effect, high cost and complex operation of existing crane stop devices, the present invention provides a foldable rail-mounted crane stop device, which is in the form of an elastic stop, consumes the energy generated by crane wheel braking with springs, and can realize rapid and short-distance braking. The device may be mounted at an end of a crane rail in advance for the braking of the crane at the end of the rail, is convenient to manufacture and install, has a long service life, and ensures the safety of crane operation. The device can be folded in a static state, and the entire structure is esthetic in appearance after installation.

To realize the purposes described above, the present invention employs the following technical scheme. A foldable rail-mounted crane stop device includes an actuating device, a slidably fixing device and a braking device. The actuating device is mounted on a crane rail for bearing a pressure of crane wheels and thereby actuating the braking device, the slidably fixing device is mounted at an end of the crane rail, and the braking device is connected to the slidably fixing device for braking the crane wheel.

In the foldable rail-mounted crane stop device, the actuating device comprises a stabilizing plate mounted on the crane rail, wherein a pressed plate is mounted on the stabilizing plate via an actuating spring, and a top portion of the pressed plate is higher than a bottom edge of the crane wheel in a non-braking state.

In the foldable rail-mounted crane stop device, the slidably fixing device comprises a sliding track mounted at an end of the crane rail. Two sides of the sliding track are respectively provided with sliding grooves, each of which is provided with a first sliding block and a second sliding block therein, and the first sliding block and the second sliding block are connected to an end of the sliding track via a first sliding spring and a second sliding spring respectively.

In the foldable rail-mounted crane stop device, the sliding track consists of two pieces of L-shaped steel, which are fixed to two sides of the end of the crane rail by bolts.

In the foldable rail-mounted crane stop device, the braking device comprises two front stop rods, side walls of each front stop rod are provided with braking grooves, a braking block which can slide in the braking groove is mounted in each braking groove, and the braking block is connected to an end of the braking groove via a braking spring. An end of the front stop rod near the actuating device is provided with a wedge-shape opening for seizing the pressed plate of the actuating device, and an end of the front stop rod near the slidably fixing device is connected to the first sliding block via a rotating shaft. The braking block is connected with one end of a rear support rod through the rotating shaft, the other end of the rear support rod is connected to the second sliding block via the rotating shaft, a stop plate is connected between the two front stop rods, and a damping plate is attached to a side of the stop plate near the crane wheel.

In the foldable rail-mounted crane stop device, only one actuating device is provided or two actuating devices are provided on two sides of the crane rail, depending on a model of a crane.

Beneficial effects are described as follows. Compared with the traditional braking schemes, the stop device provided by the present invention consumes the kinetic energy generated by crane wheel braking with springs and converts the kinetic energy into elastic energy, thereby attains a good stopping effect. Less braking distance and braking time are required, and emergency braking can be realized. The center of gravity of the crane wheel is always at the same height during the braking, avoiding derail and overturn of the crane. The entire stop buffer device has a simple structure and is convenient to manufacture and install, the damping plate and spring required for braking can be replaced at any time, and the device has a longer service life. The stop device can be folded in a static state, can be actuated automatically for braking, does not need any external power source or manual mechanical assistance, and has broad application prospects.

DESCRIPTION OF THE EMBODIMENTS

Hereunder the technical schemes implemented in the present invention will be described clearly and completely. The embodiments described below are only a part of embodiments rather than all embodiments of the present invention. All other embodiments obtained by the person skilled in the art on the basis of the embodiments of the present invention without doing any creative work should be deemed as falling in the protection scope of the present invention.

Figure 1:
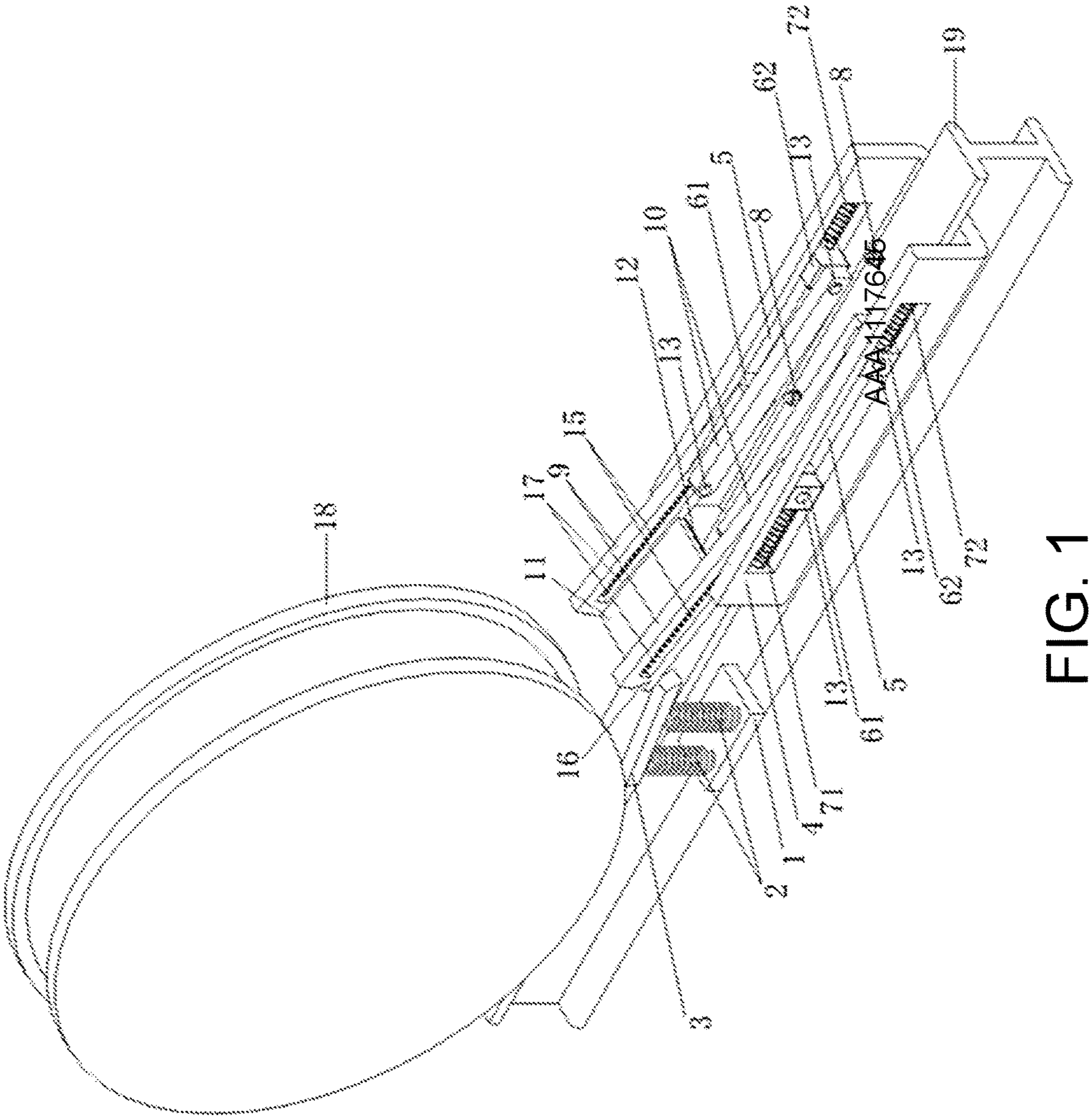
FIG. 1 is a schematic view of the overall structure of a foldable rail-mounted crane stop device according to the present invention.
Figure 2:
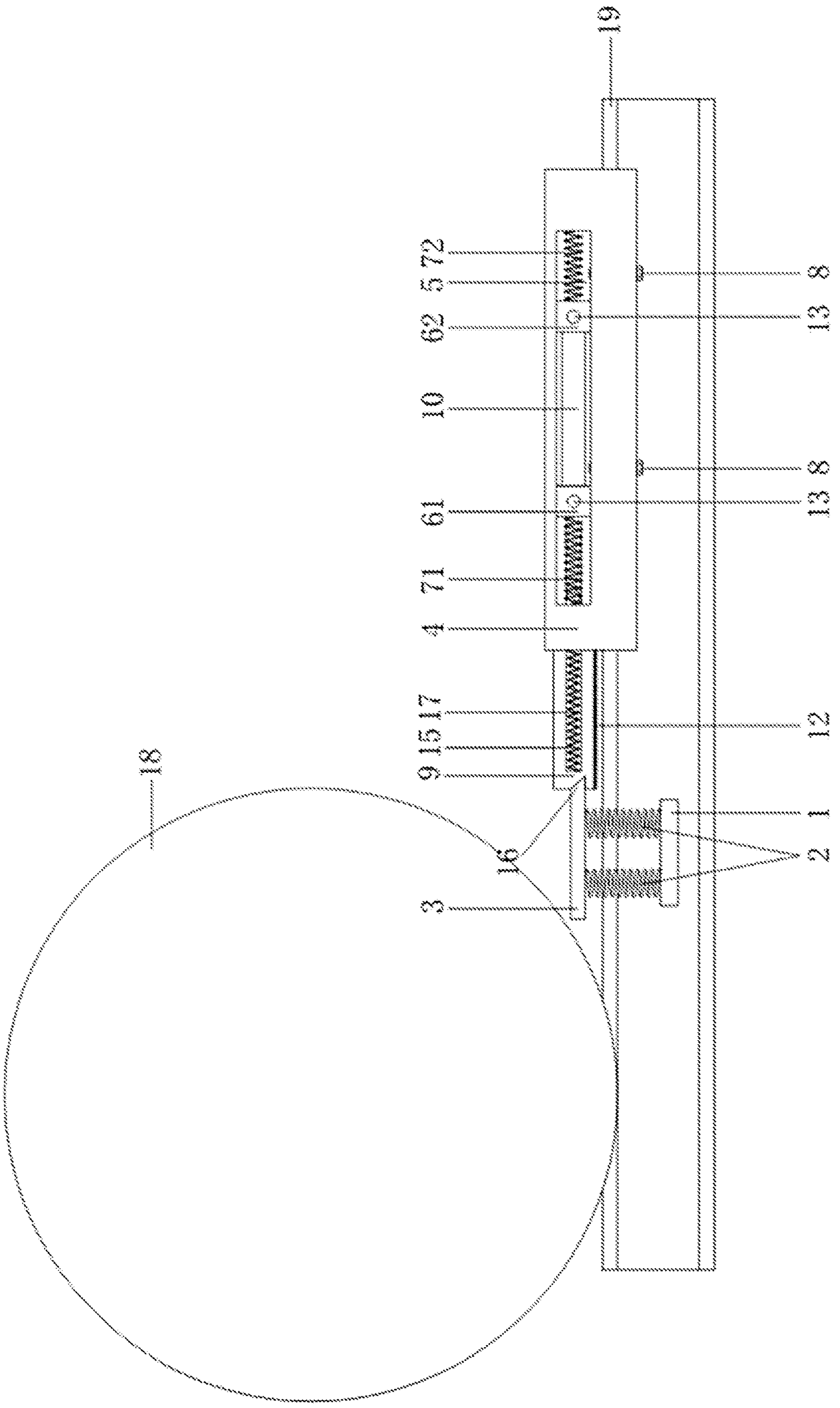
FIG. 2 is a front view of the overall structure of the foldable rail-mounted crane stop device according to the present invention.
Figure 3:
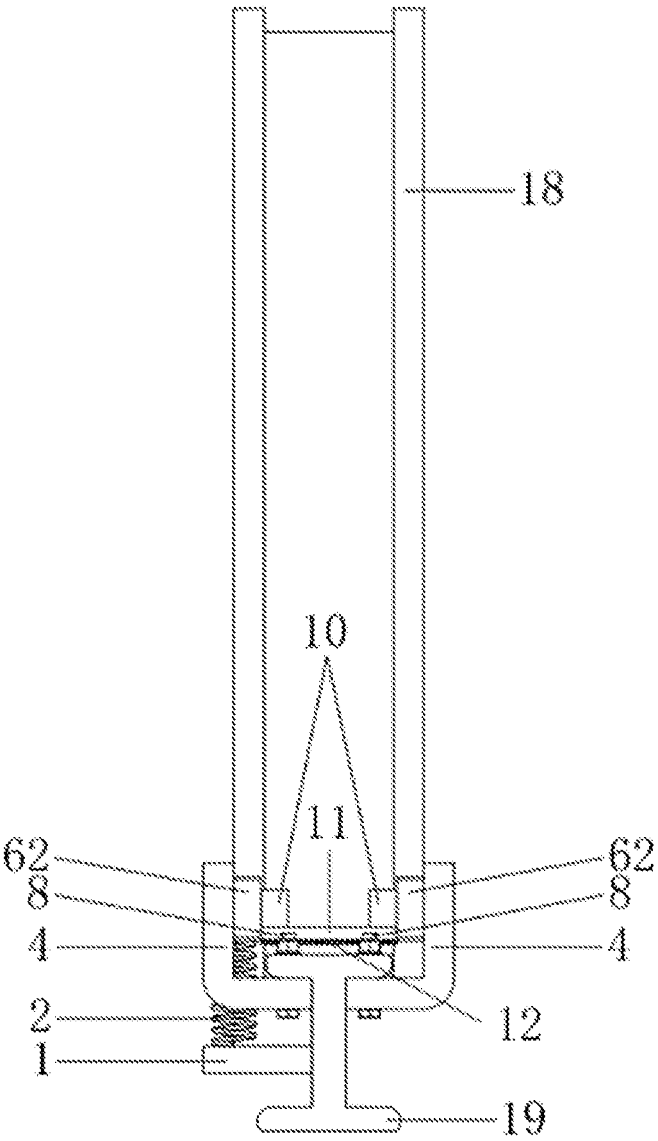
FIG. 3 is a side view of the overall structure of the foldable rail-mounted crane stop device according to the present invention.
Figure 4:
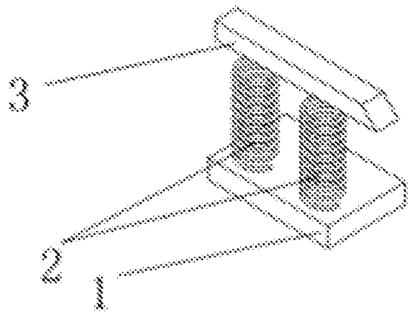
FIG. 4 is a schematic view of an actuating device of the foldable rail-mounted crane stop device according to the present invention.
Figure 5:
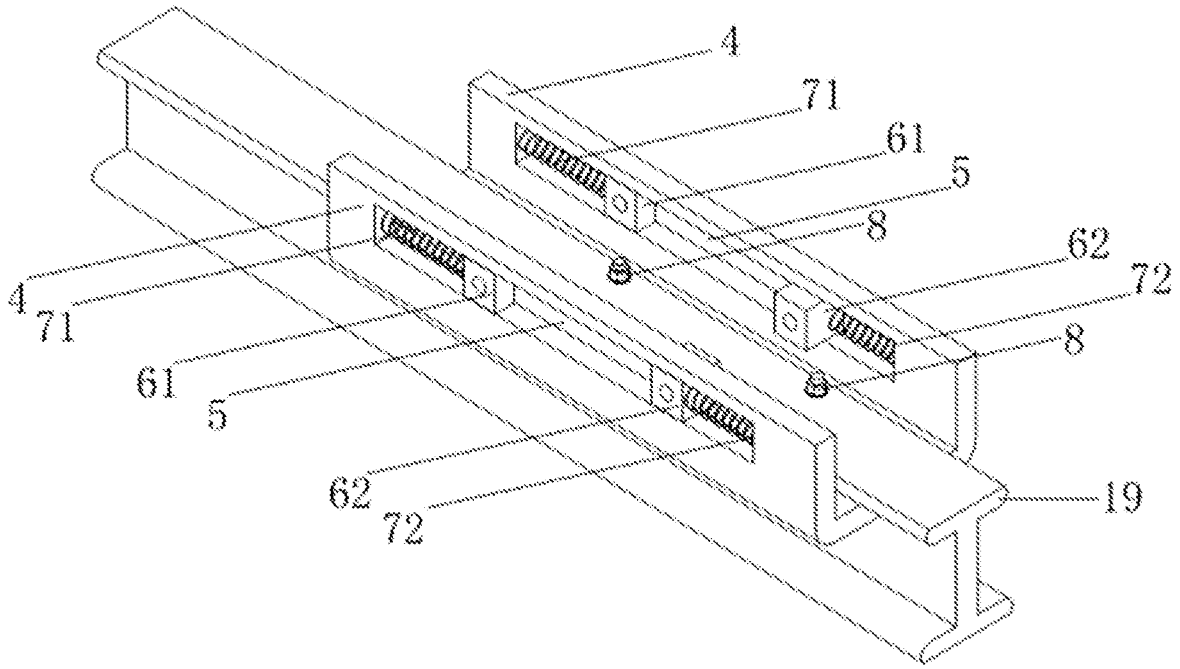
FIG. 5 is a schematic view of a slidably fixing device of the foldable rail-mounted crane stop device according to the present invention.
Figure 6:
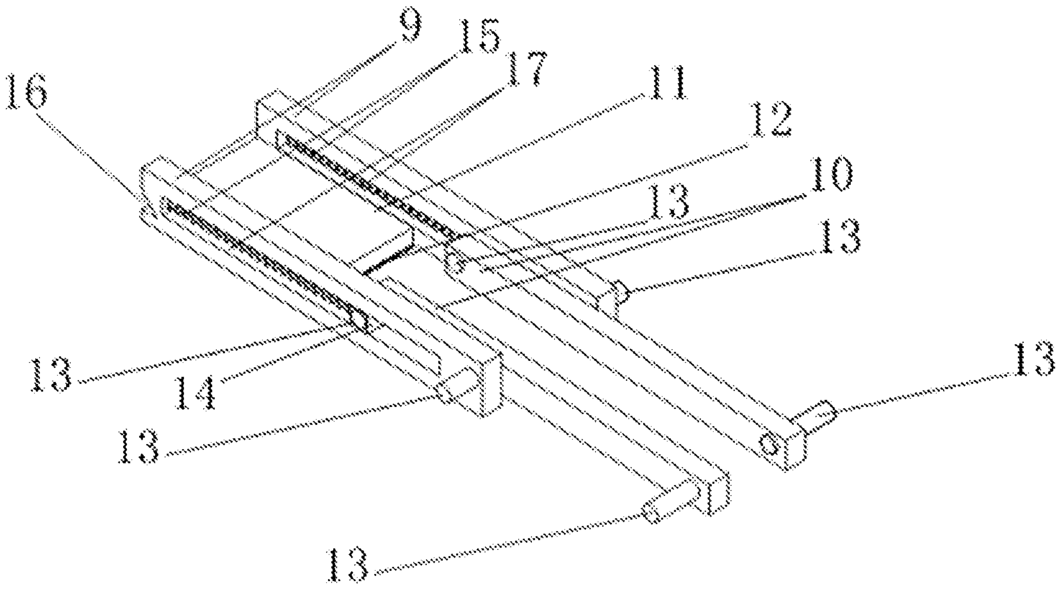
FIG. 6 is a schematic view of a braking device of the foldable rail-mounted crane stop device according to the present invention.
Figure 7:
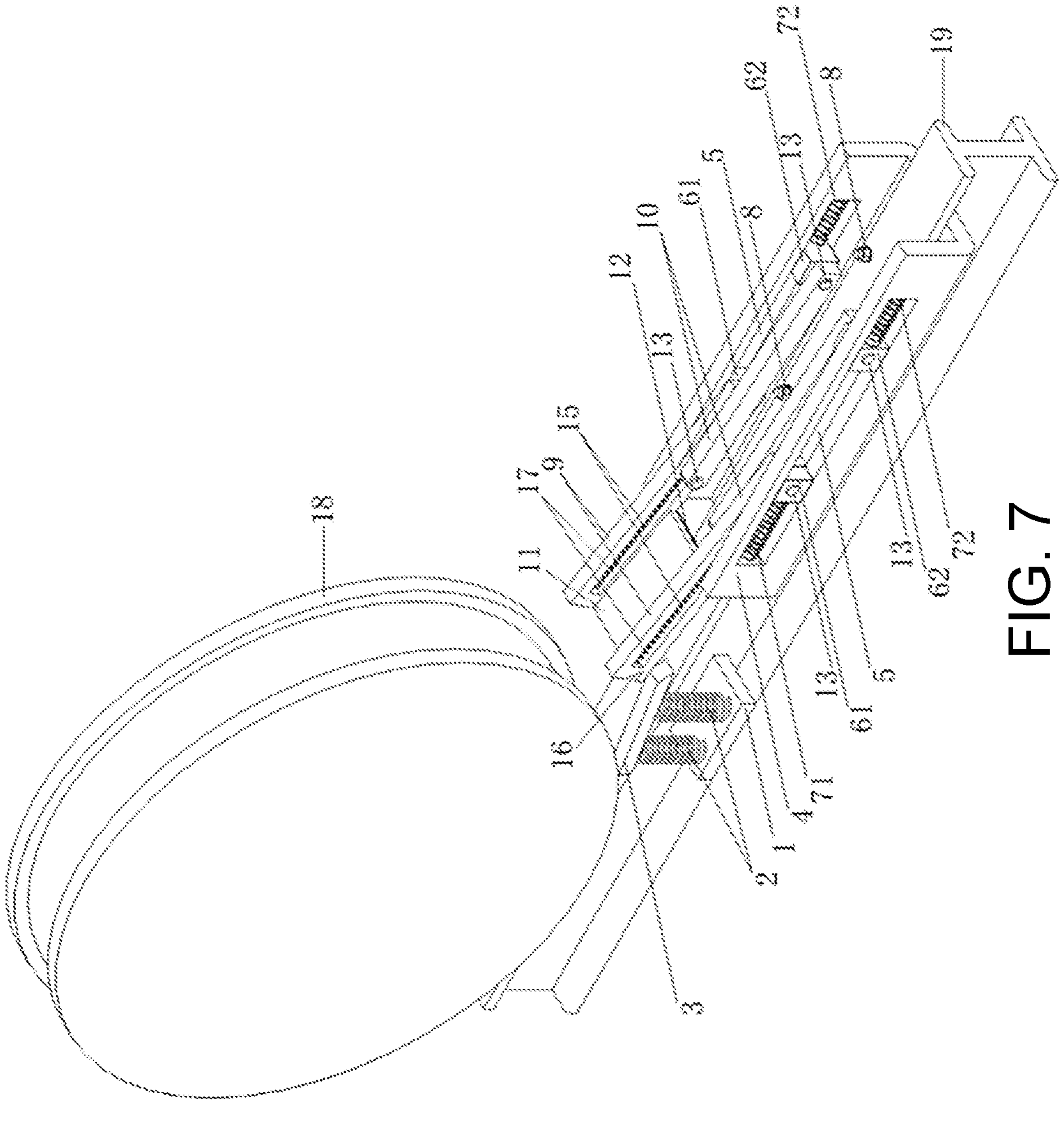
FIG. 7 is a schematic view of an actuating state of the foldable rail-mounted crane stop device according to the present invention.

Please see FIGS. 1-7. The foldable rail-mounted crane stop device in the present invention is installed at an end of a crane rail 19, and its important function is to stop a crane wheel 18.

A stabilizing plate 1 is fixed to one side of the crane rail 19, and a pressed plate 3 is connected with the stabilizing plate 1 via two actuating springs 2. A sliding track 4 is fixed to the crane rail 19 by bolts 8, a first sliding block 61 and a second sliding block 62 are seized in sliding grooves 5 and connected with the sliding track 4 via a first sliding spring 71 and a second sliding spring 72. A front stop rod 9 and one end of a rear support rod 10 are connected with the first sliding block 61 and the second sliding block 62 in the sliding grooves 5 via a rotating shaft 13 respectively, and the other end of the rear support rod 10 is connected with a braking block 14 in a braking groove 17 via the rotating shaft 13. A stop plate 11 is fixed in the middle of the front stop rod 9, and a damping plate 12 is adhered to the side of the stop plate 11 near the crane wheel.

The stabilizing plate 1 is a rectangular steel plate fixed to a side of the crane rail 19, mainly for receiving the actuating spring 2 and the pressed plate 3 and bearing the vertical pressure of the crane wheel 18.

The actuating spring 2 consists of two high-strength springs, mainly for connecting the stabilizing plate 1 and the pressed plate 2 and deforming under the pressure of the crane wheel 18 to actuate the entire stop device.

The pressed plate 3 is a rectangular steel plate, mainly for directly bearing the vertical pressure of the crane wheel 18 and cooperating with the actuating spring 2 to actuate the entire stop device. In a folded state, the pressed plate 3 is in a horizontal state, and the top portion of the pressed plate 3 is higher than the bottom edge of the crane wheel 18. A side of the pressed plate 3 is wedged and seized in the wedge-shaped groove 16 of the front stop rod 9, so that the entire stop device is in a folded state. When the crane wheel 18 comes into contact with the pressed plate 3, the actuating spring 2 is deformed, the pressed plate 3 is inclined and disengaged from the front stop rod 9, and thereby the entire stop device is actuated.

The sliding track 4 consists of two pieces of L-shaped steel fixed to the ends of the crane rail 19 by bolts 8, and its function is mainly for fixing the entire stop device to the ends of the crane rail 19.

The sliding groove 5 is arranged in the sides of the sliding track 4, mainly for allowing the first sliding block 61 and the second sliding block 62 to slide freely in the sliding grooves 5 along the travel direction of the crane wheel 18 without disengaging from the sliding track 4.

The first sliding spring 71 and the second sliding spring 72 connect the sliding track 4, the first sliding block 61 and the second sliding block 62, mainly for consuming energy in the stop process of the crane wheel 18. In a folded state, the pulling forces of the first sliding spring 71 and the second sliding spring 72 are in balance with the pulling force of the braking spring 15. In a stop state, the first sliding spring 71 is in a stretched state, while the second sliding spring 72 is in a compressed state.

The front stop rod 9 consists of two long steel rods, and the rear support rod 10 also consists of two long steel rods, the front stop rod 9 and the rear support rod 10 are mounted on the inner sides of the sliding track 4, mainly for forming a stable triangular supporting structure in the stop state to stop the crane wheel 18.

The stop plate 11 is a rectangular steel plate, mainly for directly bearing the impact of the crane wheel 18.

The damping plate 12 is adhered to the side of the stop plate 11 near the crane wheel 18, mainly for preventing the damage to the entire stop device resulted from excessive impact force of the crane wheel 18.

The rotating shaft 13 is a steel pin shaft, mainly for connecting the force bearing components and the force transfer components, so that the front stop rod 9 and the rear support rod 10 can rotate around the rotating shaft 13 with respect to each other without disengaging from the rotating shaft 13.

The braking spring 15 is configured to connect the braking block 14 and the front stop rod 9, mainly for consuming energy in the stop process of the crane wheel 18 and preventing the front stop rod 9 from being damaged by excessive impact force of the rear support rod 10 when the entire device is actuated.

The wedge-shaped groove 16 is arranged in the side of the front stop rod 9 near the actuating device, mainly for seizing the pressed plate 3.

The braking groove 17 is arranged in a side of the front stop rod 9, mainly for allowing the braking block 14 to slide freely in the braking groove 17 along the length direction of the front stop rod 9 without disengaging from the front stop rod 9.

Hereunder the method of installing the device in the present invention will be detailed with reference to FIGS. 1-6.

1. All of the components of the device in the present invention are prefabricated in the plant, and can be assembled simply on site. The damping plate 12, the actuating spring 2, the first sliding spring 71, the second sliding spring 72 and the braking spring 15 used in the present invention are existing industrial products, and can be selected as required in the installation.

2. The stabilizing plate 1 is welded to a side of the crane rail 19 in advance, a wedge-shape opening is pre-formed at an end of the pressed plate 3, and then the stabilizing plate 1 and the pressed plate 3 are connected by means of the actuating spring 2. Thus, the actuating device is installed.

3. The sliding grooves 5 is pre-formed in a side of the sliding track 4 in advance, and the first sliding block 61 and the second sliding block 62 are mounted in the sliding groove 5. Then, the first sliding block 61 and the second sliding block 62 are connected with the sliding track 4 by means of the first sliding spring 71 and the second sliding spring 72, and the sliding track 4 is fixed to the two sides of the crane rail 19 by bolts 8. Thus, the slidably fixing device is installed.

4. The braking groove 17 is pre-formed in a side of the front stop rod 9, the braking block 14 is mounted in the braking groove 17, and then the braking block 14 is connected with the front stop rod 9 by means of the braking spring 15. The stop plate 11 is welded in the middle of the front stop rod 9 in advance, and the damping plate 12 is adhered to the side of the stop plate 11 near the crane wheel 18. The end of the front stop rod 9 near the slidably fixing device is connected with the first sliding block 61 by means of the rotating shaft 13. One end of the rear support rod 10 is connected with the braking block 14 in the braking groove 17 by means of the rotating shaft 13, the and the other end of the rear support rod 10 is connected with the second sliding block 62 by means of the rotating shaft 13, and the wedge-shape opening at one end of the pressed plate 3 is seized in the wedge-shaped groove 16 in the front stop rod 9, so that the entire stop device is in a folded state. Now, the installation of the entire device is completed.

Figure 8:
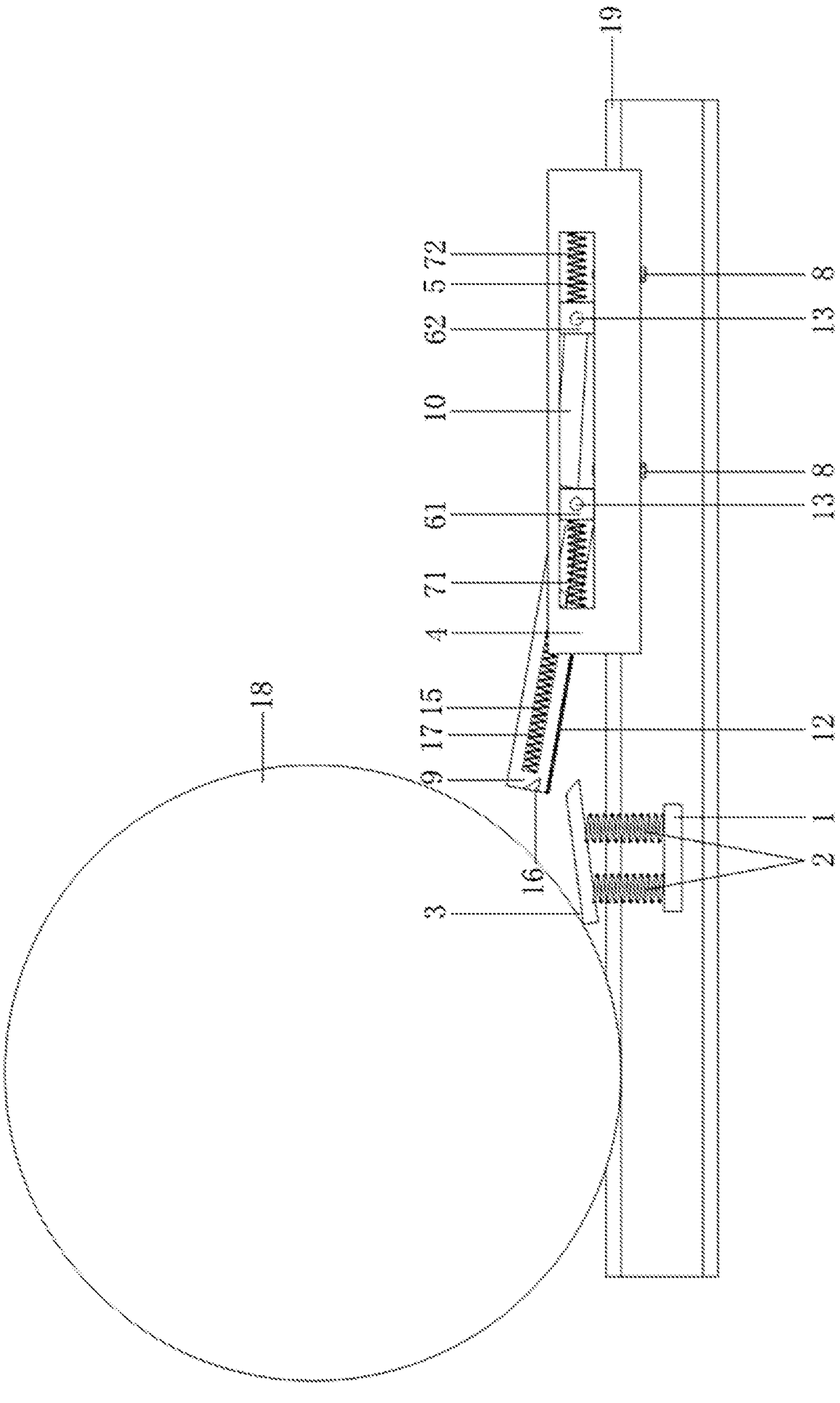
FIG. 8 is a front view of the actuating state of the foldable rail-mounted crane stop device according to the present invention.
Figure 9:
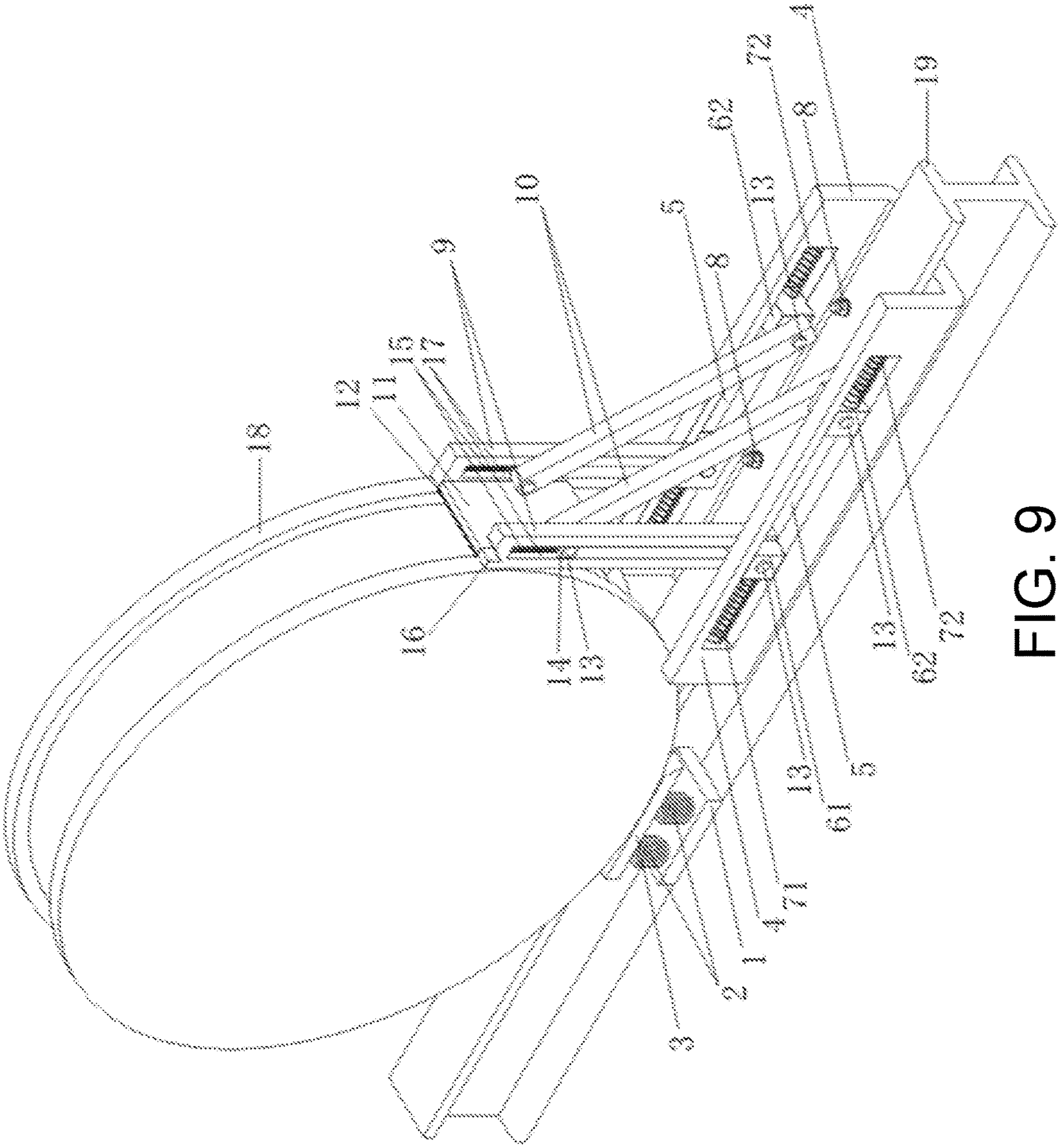
FIG. 9 is a schematic view of a stopping state of the foldable rail-mounted crane stop device according to the present invention.
Figure 10:
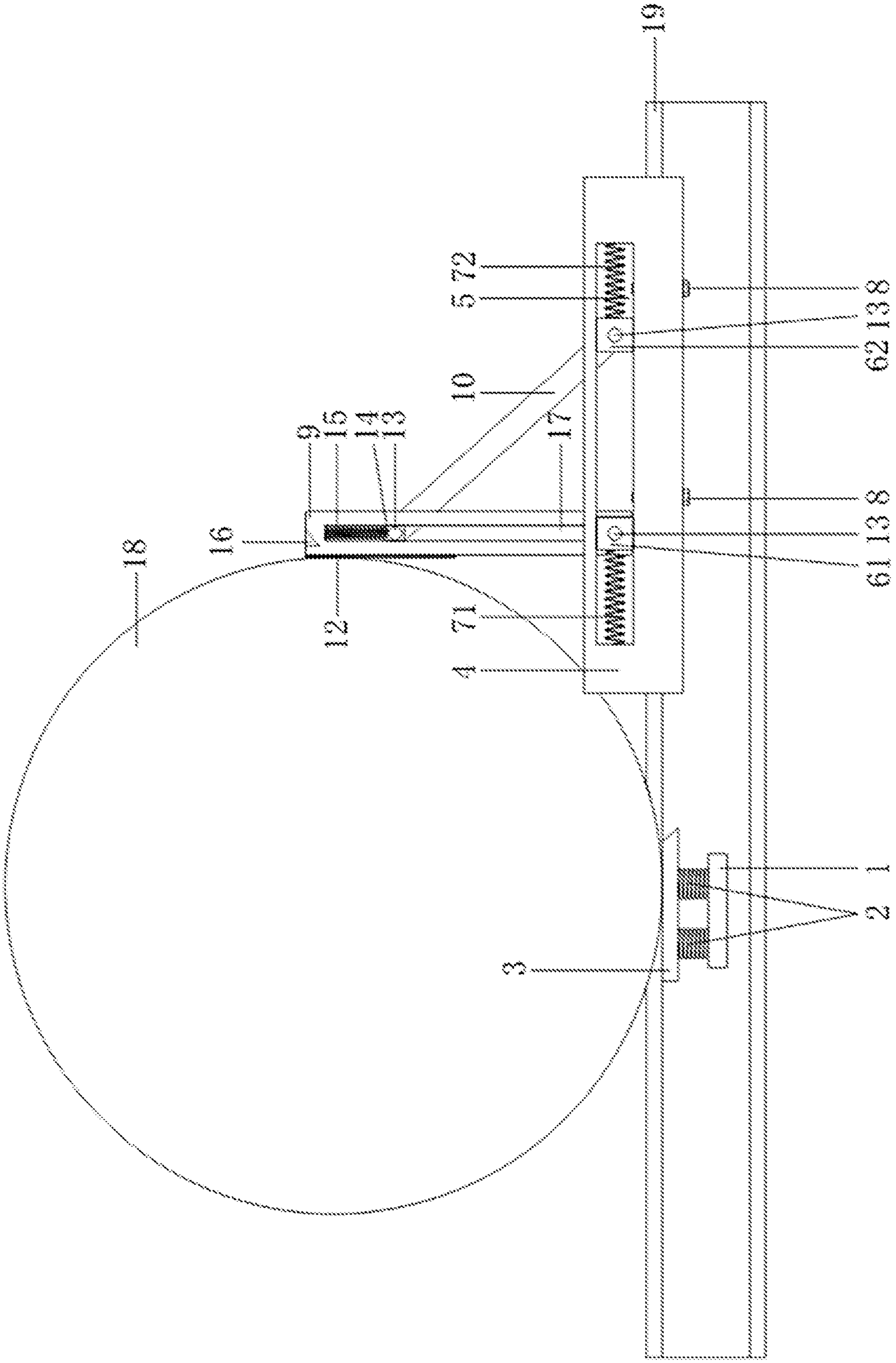
FIG. 10 is a front view of the stopping state of the foldable rail-mounted crane stop device according to the present invention.

Hereunder the stop principle in the present invention will be detailed with reference to FIGS. 7-10.

1. In a normal state (i.e., non-braking state), the actuating spring 2 is in a stable state, the pressed plate 3 is in a horizontal state, the top of the pressed plate 3 is higher than the bottom edge of the crane wheel 18, a side of the pressed plate 3 is wedged-shaped and seized in the wedge-shaped groove 16 in the front stop rod 9, and the pulling force of the first sliding spring 71, the second sliding spring 72 and the braking spring 15 are in balance, so that the front stop rod 9 has a force balance in the horizontal direction and is in a static state, and the entire stop device is in a folded state. At this point, the braking spring 15 is in a stretched state, so as to pull the end of the rear support rod 10 to move toward the end of the front stop rod 9 after actuation, and thus to form a stable triangular supporting structure.

2. When the crane wheel 18 comes into contact with the pressed plate 3, the actuating spring 2 is deformed, the pressed plate 3 is inclined and disengaged from the wedge-shaped groove 16 in the front stop rod 9, and thereby the entire stop device is actuated. The stretched braking spring 15 pulls the end of the rear support rod 10 to move toward the end of the front stop rod 9, so that the entire stop device is raised. The crane wheel 18 moves further in the direction of the stop device and comes into contact with the damping plate 12 on the stop plate 11 in the middle of the front stop rod 9, so that the stop device is further forced to rise, and finally the front stop rod 9 and the rear support rod 10 forms a stable triangular supporting structure. Under the pushing action of the crane wheel 18, the first sliding spring 71 is stretched continuously, while the second sliding spring 72 is compressed continuously, the kinetic energy generated by the braking of the crane wheel 18 is consumed continuously and converted into the elastic energy of the spring, and finally the crane wheel 18 is stopped. Thus, the entire stop process is completed.

While the technical scheme and beneficial effects of the present invention are further detailed above in the specifically implemented operation method, it should be understood that the above embodiments are specific embodiments of the present invention. Any modification, equivalent replacement, or improvement made within the spirit and principle of the present invention should be deemed as falling in the protection scope of the present invention.

What is claimed is:

1. A foldable rail-mounted crane stop device, comprising an actuating device, a slidably fixing device and a braking device, wherein the actuating device is mounted on a crane rail for bearing a pressure of a crane wheel and actuating the braking device, the slidably fixing device is mounted at one end of the crane rail, and the braking device is connected to the slidably fixing device for braking the crane wheel;

wherein the slidably fixing device comprises a sliding track mounted at an end of the crane rail, two sides of the sliding track are respectively provided with sliding grooves, each of the sliding grooves is provided with a first sliding block and a second sliding block therein, and the first sliding block and the second sliding block are respectively connected to an end of the sliding track via a first sliding spring and a second sliding spring;

wherein the braking device comprises two front stop rods, side walls of each front stop rod are provided with braking grooves, a braking block which is slidable in the braking groove is mounted in each braking groove, and the braking block is connected to an end of the braking groove via a braking spring; an end of each front stop rod near the actuating device is provided with a wedge-shaped opening for seizing a pressed plate of the actuating device, and an end of each front stop rod near the slidably fixing device is connected to the first sliding block via a rotating shaft; the braking block is connected to one end of a rear support rod through the rotating shaft, another end of the rear support rod is connected to the second sliding block via the rotating shaft, a stop plate is connected between the two front stop rods, and a damping plate is adhered to a side of the stop plate near the crane wheel.

2. The foldable rail-mounted crane stop device according to claim 1, wherein the actuating device comprises a stabilizing plate mounted on the crane rail, the pressed plate is mounted on the stabilizing plate via an actuating spring, and a top portion of the pressed plate is higher than a bottom edge of the crane wheel in a non-braking state.

3. The foldable rail-mounted crane stop device according to claim 1, wherein the sliding track consists of two pieces of L-shaped steel, which are fixed to two sides of the end of the crane rail by bolts.

4. The foldable rail-mounted crane stop device according to claim 1, wherein only one actuating device is provided or two actuating devices are provided on two sides of the crane rail, depending on model of a crane.

* * * * *